United States Patent [19]
Wu

[11] Patent Number: 5,628,239
[45] Date of Patent: May 13, 1997

[54] INFUSING UNIT FOR A VENTURI-TYPE BUBBLE-FORMING APPARATUS

[76] Inventor: Tsann-Kuen Wu, No. 3, Ka Fa 2nd Rd., Pao An Ind. District, Ren Teh Hsiang, Tainan Hsien, Taiwan

[21] Appl. No.: 625,169

[22] Filed: Mar. 29, 1996

[51] Int. Cl.[6] .................................................. A47J 31/40
[52] U.S. Cl. ........................ 99/190; 99/295; 99/300; 99/323.1
[58] Field of Search ............................ 99/279, 293, 290, 99/291, 295, 300, 302 R, 323.1; 261/DIG. 16, DIG. 76

[56] References Cited

U.S. PATENT DOCUMENTS

| | | | |
|---|---|---|---|
| 5,165,520 | 11/1992 | Giuliano | 99/323.1 |
| 5,295,431 | 3/1994 | Schiettecatte | 99/323.1 |
| 5,330,266 | 7/1994 | Stubaus | 99/193 |
| 5,423,245 | 6/1995 | Midden | 99/323.1 |
| 5,473,972 | 12/1995 | Rizzuto | 99/290 |

*Primary Examiner*—Robert W. Jenkins
*Attorney, Agent, or Firm*—Handal & Morofsky

[57] ABSTRACT

An infusing unit is employed in a bubble-forming apparatus which includes a venturi-tube type inlet pipe unit, a discharge pipe unit, and a branch pipe. The infusing unit includes an infusing casing with a large-diameter upper section within which a main pipe section of the inlet pipe unit is press-fitted so as to establish a fluid-tight seal therebetween, and a small-diameter lower section located coaxially within the discharge pipe unit. A truncated conical lower end portion of the inlet pipe unit is located within the large-diameter upper section of the infusing casing and ranges from 1.0 mm to 1.7 mm in inner diameter. The infusing casing further has an integral tubular section which extends radially and outwardly from the lower section of the infusing casing and which is press-fitted into the branch pipe. The integral tubular section ranges from 2.5 mm to 3.5 mm in inner diameter. The lower section of the infusing casing has a tapered upper portion which decreases gradually downward in inner diameter, and a straight lower portion which extends integrally and downwardly from the tapered upper portion and which has an axial length ranging from 2.0 mm to 4.0 mm and an inner diameter ranging from 2.0 mm to 3.0 mm.

6 Claims, 5 Drawing Sheets

5,628,239

INFUSING UNIT FOR A VENTURI-TYPE BUBBLE-FORMING APPARATUS

BACKGROUND OF THE INVENTION

1. Field of the Invention

The invention relates to an infusing unit, more particularly to an infusing unit for a venturi-type bubble-forming apparatus.

2. Description of the Related Art

The high-pressure vapor produced by coffee makers has been used for drawing a beverage, such as milk, into a container so as to bubble the same according to the principle of a venturi tube. The improvement of this invention is directed to an infusing unit employed in a conventional venturi-type bubble-forming apparatus shown in FIGS. 1 and 2. As illustrated, the bubble-forming apparatus 1 includes a coffee maker 10 with a venturi-tube type pipe unit 11, a beverage container 12, and an infusing unit 13 fixed on a mounting portion 123 of the container 12. The container 12 defines a beverage chamber 121 therein and includes a discharge pipe unit 127 projecting therefrom and a height adjustment device 14 consisting of an elongated stand 142 which extends into a hollow post 122 of the container 12, and an elastic ring 141 sleeved around the stand 142 in such a manner that the ring 141 interengages frictionally the stand 142 and the post 122, thereby positioning the container 12 at a desired height. A cap 143 covers the upper section of the hollow post 122. The infusing unit 13 includes a generally tubular infusing casing 13C with a small-diameter lower section 131 inserted into a mounting wall 124 of the container 12 and fluidly communicated with the discharge pipe unit 127, a large-diameter upper section 137 with a horizontal pipe section 13a within which a truncated conical lower end portion 111 of the pipe unit 11 is press-fitted so as to deliver high-pressure gas from the coffee maker 10 into the infusing casing 13C, and a branch pipe 16 for drawing the beverage from the beverage container 12 into the infusing casing 13C so as to mix the beverage with the gas in the infusing casing 13C, thereby forming a combined fluid which is discharged from the container 12 through the discharge pipe unit 127. A cover plate 135 is disposed on the upper section 137 of the infusing casing 13C so as to cover the same and has a downwardly extending turbulence arm 130. A clamp unit 13D includes a positioning arm 133 placed on the cover plate 135, a positioning pin 136 extending through a peripheral notch 135a of the cover plate 135 into the hole 139 in an integral post 13b of the infusing casing 13C, and two locking bolts 132 extending through the holes of the positioning arm 133 and threaded in the mounting posts 125 so as to fix the infusing casing 13C in the container 12.

A drawback of the aforesaid infusing unit is that numerous components are needed and relatively complicated steps are required to assemble the same. Cleaning of the infusing casing is therefore inconvenient to conduct.

SUMMARY OF THE INVENTION

The object of this invention is to provide an infusing unit which is to be used in a venturi-tube type bubble-forming apparatus, and which is simple in structure and easy to manufacture.

Accordingly, the infusing unit of this invention is employed in a bubble-forming apparatus which includes a venturi-tube type inlet pipe with a main pipe section and a truncated conical lower end portion, a discharge pipe unit, and a branch pipe connected to the infusing unit at a position between the inlet pipe unit and the discharge pipe unit for drawing a liquid thereinto so as to mix the liquid with gas from the inlet pipe, thereby forming a combined fluid which is discharged through the discharge pipe unit. The infusing unit includes a tubular infusing casing with a large-diameter upper section within which the main pipe section of the inlet pipe unit is press-fitted in such a manner that a fluid-tight seal is established between the large-diameter upper section and the main pipe section, and a small-diameter lower section located coaxially within the discharge pipe unit. The truncated conical lower end portion of the inlet pipe unit is located within the large-diameter upper section of the infusing casing and ranges from 1.0 mm to 1.7 mm in inner diameter. The infusing casing further has an integral tubular section which extends radially and outwardly from the lower section of the infusing casing and which is press-fitted into the branch pipe. The integral tubular section ranges from 2.5 mm to 3.5 mm in inner diameter. The lower section of the infusing casing has a tapered upper portion which decreases gradually downward in inner diameter, and a straight lower portion which extends integrally and downwardly from the tapered upper portion and which has an axial length ranging from 2.0 mm to 4.0 mm and an inner diameter ranging from 2.0 mm to 3.0 mm.

BRIEF DESCRIPTION OF THE DRAWINGS

Other features and advantages of this invention will become more apparent in the following detailed description of the preferred embodiment with reference to the accompanying drawings, in which.

DETAILED DESCRIPTION OF THE PREFERRED EMBODIMENT

Figure 1:
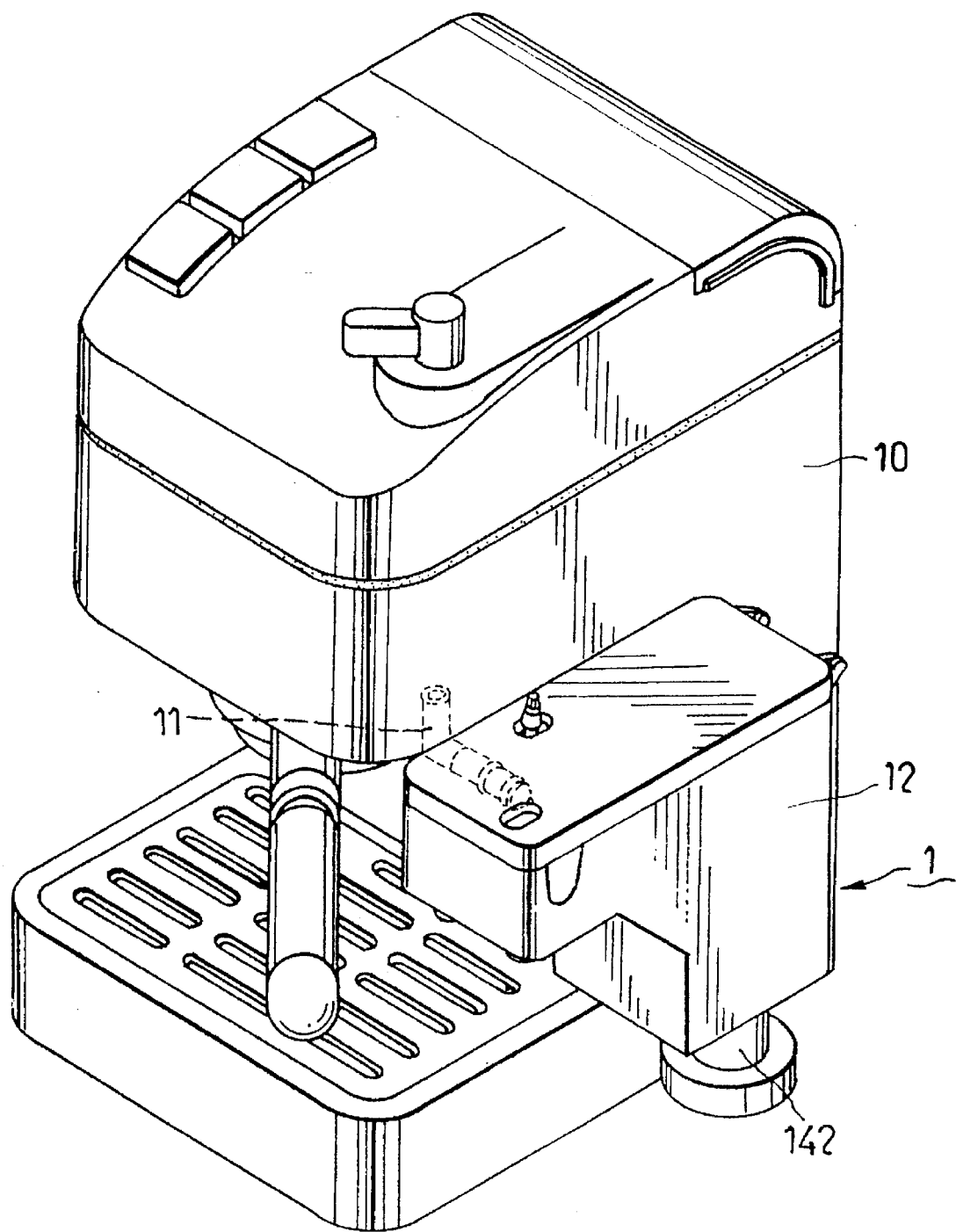
FIG. 1 is a perspective view of a venturi-tube type bubble-forming apparatus which employs a conventional infusing unit.
Figure 2:
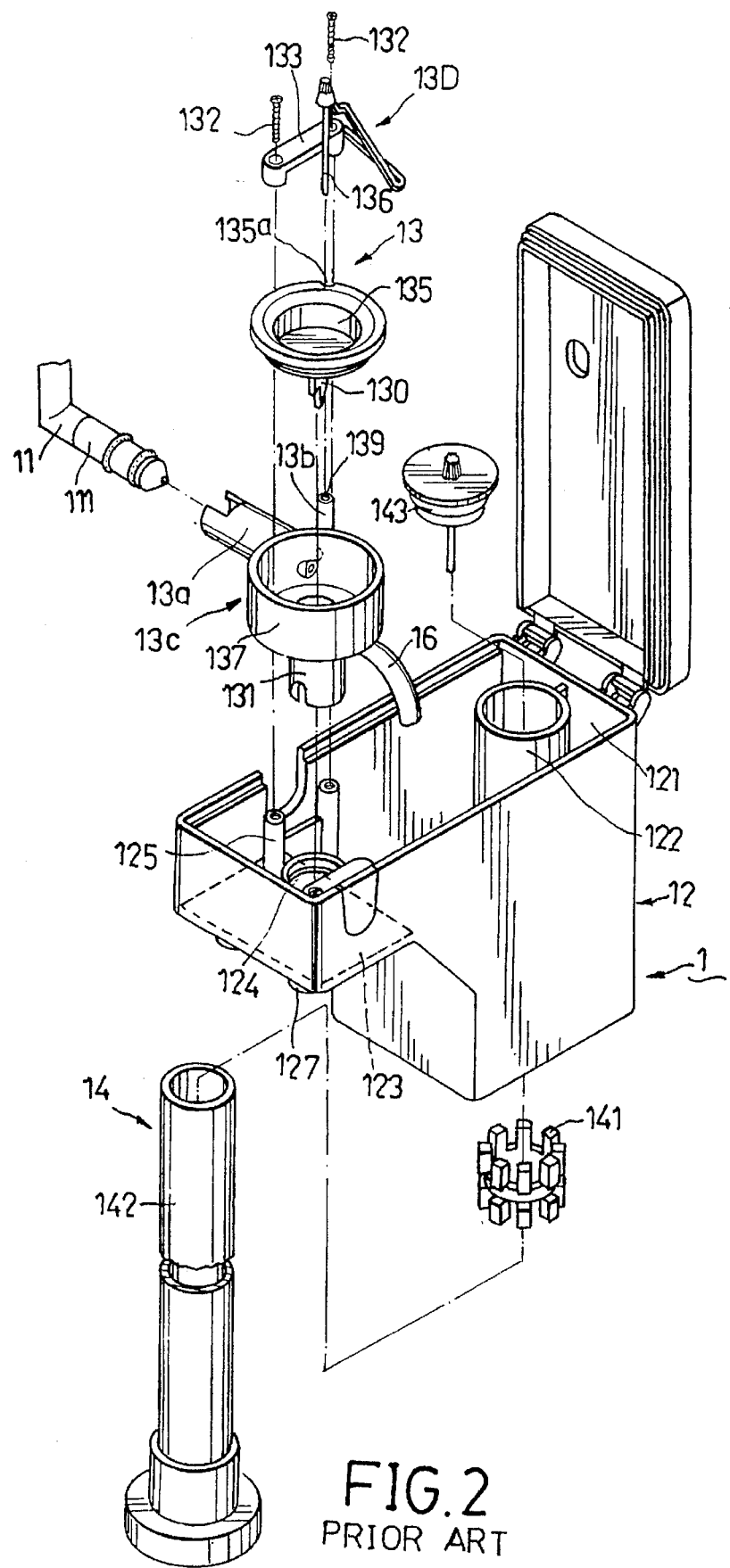
FIG. 2 is an exploded view of a portion of the bubble-forming apparatus shown in FIG. 1, in which the conventional infusing unit is illustrated.
Figure 3:
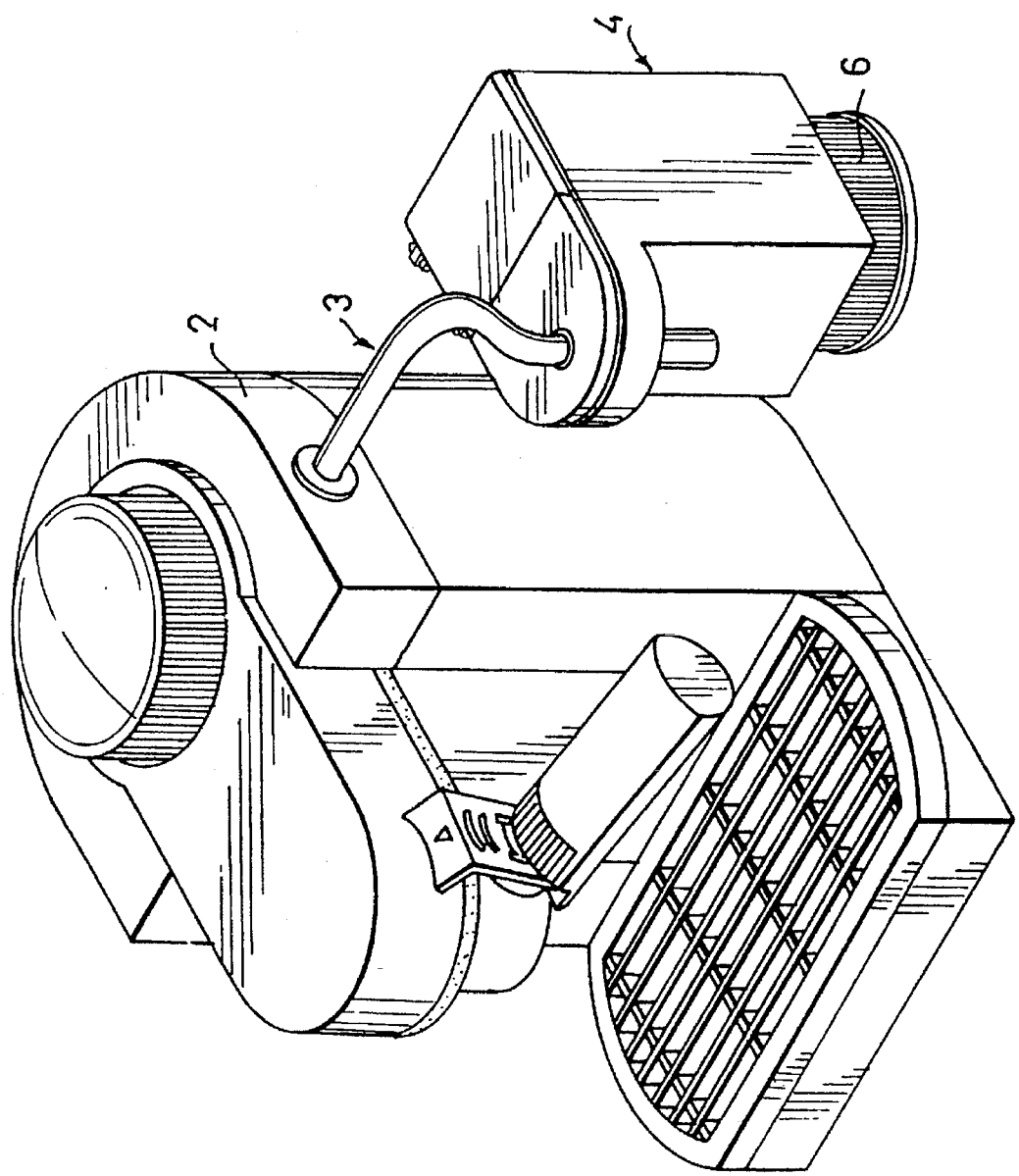
FIG. 3 is a perspective view of a venturi-tube type bubble-forming apparatus which employs an infusing unit according to this invention.
Figure 4:
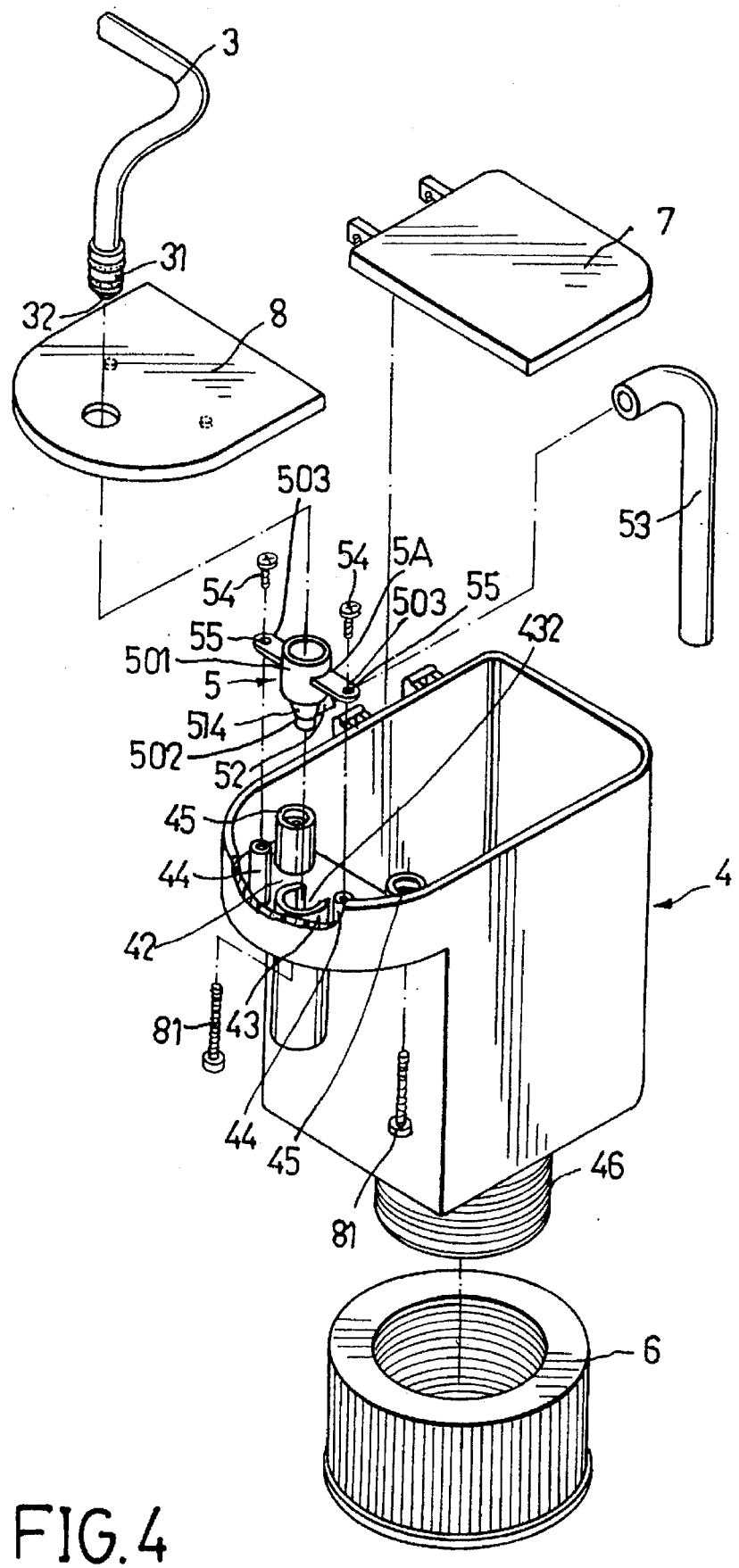
FIG. 4 is an exploded view of a portion of the bubble-forming apparatus shown in FIG. 3, in which the infusing unit of this invention is illustrated.
Figure 5:
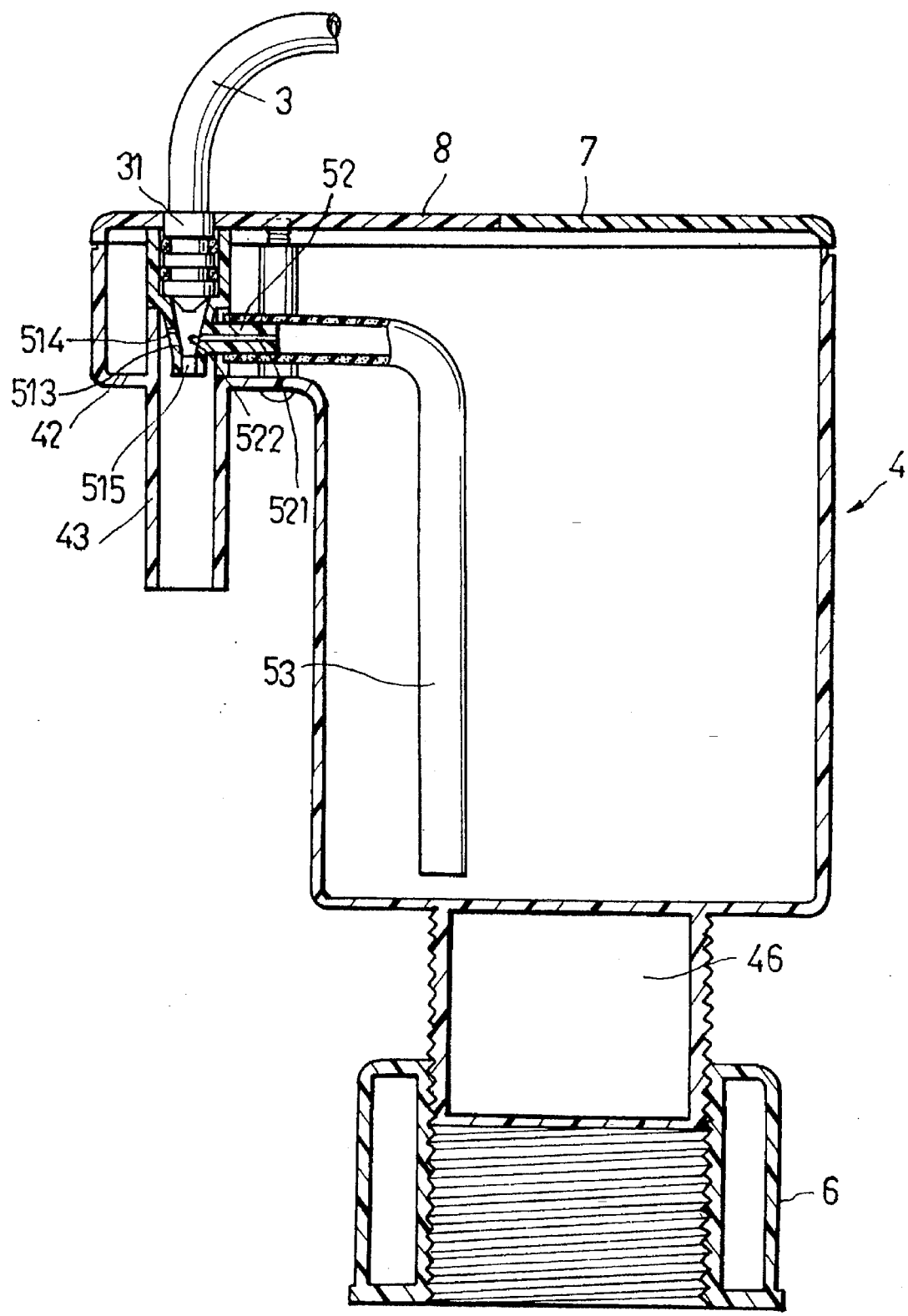
FIG. 5 is a sectional view of the bubble-forming apparatus shown in FIG. 3.

Referring to FIGS. 3 to 5, a one-piece infusing unit 5 of this invention is employed in a bubble-forming apparatus which includes a coffee maker 2, a venturi-tube type inlet pipe unit 3 provided with a main pipe section 31 connected to the coffee maker 2, a discharge pipe unit 43 extending out from a beverage container, such as milk container 4, and an inverted L-shaped branch pipe 53 that is disposed within the milk container 4 and that extends into the infusing unit 5. The inlet pipe unit 3 has a truncated conical lower end portion 32 decreasing downward from the main pipe section 31 in inner diameter and is adapted to permit passage of a high-pressured gas therethrough.

As illustrated, the infusing unit 5 is disposed between the inlet pipe unit 3 and the discharge pipe unit 43 so as to be in fluid communication with the inlet pipe unit 3 and the discharge pipe unit 43. The infusing unit 5 includes a tubular infusing casing 5A which defines an interior chamber therein and which has a large-diameter upper section 501 within which the main pipe section 31 of the inlet pipe unit 3 is press-fitted in such a manner that a fluid-tight seal is established between the large-diameter upper section 501 and the main pipe section 31 and that the lower end portion 32 is located within the upper section 501 of the infusing casing 5A, and a small-diameter lower section 502 located coaxially within the discharge pipe unit 43 of the milk container 4. The infusing casing 5A further has a pair of mounting lugs 503 extending radially and outwardly from two opposite sides of the upper section 501, and an integral tubular section 52 which extends radially and outwardly from the lower section 502 of the infusing casing 5A and which is press-fitted into the branch pipe 53. The integral tubular section 52 has a liquid passage 521 formed therethrough. The lower section 502 of the infusing casing 5A has a tapered upper portion 513 which decreases gradually downward in inner diameter, and a straight lower portion 515 which extends integrally and downwardly from the tapered upper portion 513.

The infusing casing 5A further has a radially extending air inlet 514 which is formed through a wall of the tapered upper portion 513 of the infusing casing 5A. A height adjustment device includes an internally threaded seat 6 which receives an externally threaded lower portion 46 of the container 4 so that the height of the container 4 can be adjusted to complement the height of the infusing casing 5A with the inlet pipe unit 3.

A pair of fastening bolts 54 extend through the holes 55 of the lugs 503 and are threaded in internally threaded posts 44 which are fixed on the mounting portion 42 of the milk container 4. The container 4 is further provided with a cover plate unit consisting of a fixed front piece 8 fastened to posts 45 by means of screws 81 so as to cover the front half of the upper portion of the container 4, and a rear piece 7 mounted pivotally on the container 4 so as to cover the rear half of the upper portion of the container 4. The upper section of the discharge pipe unit 43 is formed with a notch 432 through which the integral tubular section 52 of the infusing casing 5A extends for connection with one end portion of the branch pipe 53.

To obtain a satisfactory height ratio of bubbles to milk in a glass having an inner diameter of about 80 mm, that is preferably more than 1:2, the size ranges of the related elements of the infusing casing 5A can be arranged as in the following paragraph.

The truncated conical lower end portion 32 of the inlet pipe unit 3 ranges from 1.0 mm to 1.7 mm in inner diameter. The liquid passage 521 of the integral tubular section 52 has an inner diameter ranging from 2.5 mm to 3.5 mm. The tapered upper portion 513 of the lower section 502 of the infusing casing 5A decreases gradually downward in inner diameter, while the straight lower portion 515 of the infusing casing 5A extends integrally and downwardly from the tapered upper portion 513 and has an axial length ranging from 2.0 mm to 4.0 mm, and an inner diameter ranging from 2.0 mm to 3.0 mm. An inner end 522 of the liquid passage 521 of the tubular section 52 is spaced apart from the lower end 32 of the main pipe section 31 of the inlet pipe unit 3 at a distance ranging from 1.5 mm to 3.5 mm, and from a lower end of the straight lower portion 515 of the infusing casing 5A at a distance ranging from 5.0 mm to 8.0 mm. In the event that the inner diameters of the conical lower end portion 32 of the inlet pipe unit 3 and the liquid passage 521 of the integral tubular section 52 are respectively greater than 1.7 mm and 3.5 mm, the pressure within the infusing casing 5A is too small to enable the casing 5A to suck sufficient beverage from the container 4. When the inner diameter of the straight lower portion 515 of the infusing casing 5A is greater than 3 mm, time is too little to infuse milk with gas. The axial length of the straight lower portion 515 of the infusing casing 5A is limited within the range of 2 mm to 4 mm in order to prevent the milk from being atomized. In this way, there are enough infusing time to permit the milk to mix fully with the gas so as to form sufficient bubbles in the infusing casing 5A.

When high-pressure gas is delivered from the coffee maker 2 to the infusing casing 5A, the pressure within the interior chamber of the infusing casing 5A drops so that air and milk are drawn simultaneously into the chamber of the infusing casing 5A via the air inlet 514 and the liquid passage 521 of the tubular section 52 to mix with the gas due to the principle of venturi. Therefore, the combined fluid (mixture of coffee and milk) is discharged from the container 4 through the discharge pipe unit 43.

With this invention thus explained, it is obvious to those skilled in the art that various modifications and variations can be made without departing from the scope and spirit thereof. Therefore, this invention is intended to be limited only as in the appended claims.

I claim:

1. A bubble-forming apparatus including a beverage container, a venturi-tube type inlet pipe unit having a main pipe section with a truncated conical lower end portion which decreases downward in diameter and which is adapted to permit passage of a high-pressured gas therethrough, a discharge pipe unit, a fixed infusing casing disposed in said container between said inlet pipe unit and said discharge pipe unit and having an interior chamber defined within said casing in communication with said inlet pipe unit and said discharge pipe unit, and a branch pipe which is communicated with the interior chamber of said infusing casing at a position between said inlet pipe unit and said discharge pipe unit and which is adapted to draw a liquid from the beverage container into said chamber so as to mix said liquid with said gas in said infusing casing, thereby forming a combined fluid which is discharged from said casing through said discharge pipe unit, wherein the improvement comprises:

said infusing casing being generally tubular and having a large-diameter upper section within which said main pipe section of said inlet pipe unit is press-fitted in such a manner that a fluid-tight seal is established between said large-diameter upper section and said main pipe section, and a small-diameter lower section located coaxially within said discharge pipe unit, said truncated conical lower end portion of said inlet pipe unit being located within said large-diameter upper section and ranging from 1.0 mm to 1.7 mm in inner diameter, said casing further having an integral tubular section which extends radially and outwardly from said lower section of said casing and which is press-fitted into said branch pipe so as to draw said liquid into said casing, said integral tubular section ranging from 2.5 mm to 3.5 mm in inner diameter, said lower section of said casing having a tapered upper portion which decreases gradually downward in inner diameter, and a straight lower portion which extends integrally and downwardly from said tapered upper portion and which has an axial length ranging from 2.0 mm to 4.0 mm and an inner diameter ranging from 2.0 mm to 3.0 mm.

2. The bubble-forming apparatus as defined in claim 1, wherein said infusing casing further has a radially extending air inlet which is formed through the tapered upper portion of said infusing casing.

3. The bubble-forming apparatus as defined in claim 1, wherein a height adjustment device is coupled with said infusing casing and can be adjusted so as to vary height of said infusing casing.

4. The bubble-forming apparatus as defined in claim 1, wherein the container has an externally threaded lower portion, said height adjustment device including an internally threaded seat which is adapted to be disposed on a support surface and which receives threadably said lower portion of said container so as to vary height of said infusing casing.

5. The bubble-forming apparatus as defined in claim 1, wherein said integral tubular section of said infusing casing has a liquid passage formed therethrough and has an inner end which is spaced apart from said lower end portion of said main pipe section of said inlet pipe unit at a distance ranging from 1.5 mm to 3.5 mm.

6. The bubble-forming apparatus as defined in claim 1, wherein said inner end of said integral tubular section of said infusing casing is spaced apart from a lower end of said straight lower portion of said infusing casing at a distance ranging from 5.0 mm to 8.0 mm.

* * * * *